United States Patent [19]

Yuasa et al.

[11] Patent Number: 4,721,241

[45] Date of Patent: Jan. 26, 1988

[54] WELDING APPARATUS ASSEMBLED TOGETHER WITH GRINDING DEVICE

[75] Inventors: Hiroyasu Yuasa; Namio Suganuma, both of Okayama, Japan

[73] Assignee: Kawasaki Steel Corporation, Hyogo, Japan

[21] Appl. No.: 934,209

[22] Filed: Nov. 21, 1986

[51] Int. Cl.⁴ .................. B23K 37/02; B23K 37/04; B23K 37/06; B23K 9/02
[52] U.S. Cl. ................................. 228/5.7; 228/13; 228/18; 228/32; 228/44.3; 228/50
[58] Field of Search ................ 228/5.7, 13, 18, 32, 228/44.3, 28, 125, 50

[56] References Cited

U.S. PATENT DOCUMENTS

| | | | |
|---|---|---|---|
| 3,298,587 | 1/1967 | Seeloff et al. | 228/32 |
| 3,394,857 | 7/1968 | Wheeler et al. | 228/5.7 |
| 3,403,833 | 10/1968 | Wheeler et al. | 228/5.7 |
| 3,421,676 | 1/1969 | Jenkins | 228/13 |

FOREIGN PATENT DOCUMENTS

| | | | |
|---|---|---|---|
| 2647735 | 5/1977 | Fed. Rep. of Germany | 228/13 |
| 236658 | 7/1925 | United Kingdom | 228/50 |

Primary Examiner—Nicholas P. Godici
Assistant Examiner—Samuel M. Heinrich
Attorney, Agent, or Firm—Bierman and Muserlian

[57] ABSTRACT

A welding apparatus for butt weld joint of steel plates such as steel strips is assembled together with a grinding device, which is combined in one system. The grinding device is so arranged that grinding wheels of this system can be moved along the welded joint following just after the welding torch. The clamping dies for clamping the welding portion of the steel plates are divided sectionally provided with mechanisms for shifting the respective divided clamping dies between a first clamping position during welding and a second clamping position during grinding. The upper unit of the grinding device can be moved along a rail assembly for guiding the welding torch. The lower unit of the grinding device can be moved along a rail assembly for guiding the shearing machine.

5 Claims, 8 Drawing Figures

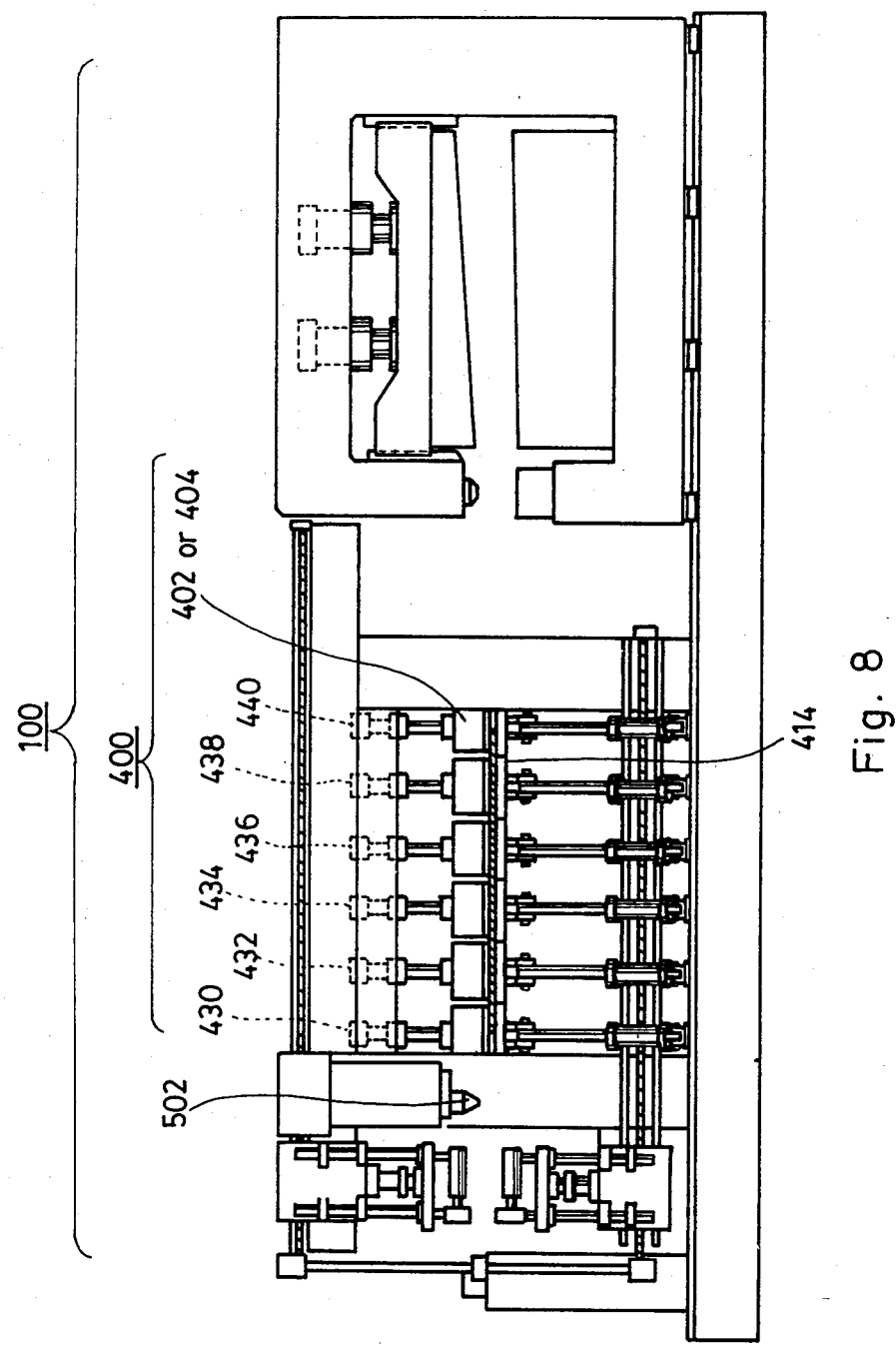

WELDING APPARATUS ASSEMBLED TOGETHER WITH GRINDING DEVICE

BACKGROUND OF THE INVENTION

1. Field of the Invention

The present invention relates to a welding apparatus assembled together with grinding device. More particularly, the present invention relates to a welding apparatus in a butt welding system for steel strip or steel plate which is particularly equipped with grinding device in one system.

2. Description of the Related Art

As conventional welding apparatuses for butt joint of steel strip or steel plate, LASER, plasma-arc, MIC or TIG welding apparatuses have been known and commonly used. Such welding apparatuses may often generate excess metal or undercut at the welded joint, which may cause stress concentration at the irregular shaped welded joint resulting sometimes in rupture at the welded portion, when the steel strip or the steel plate is subjected to the passing step of process line such as annealing, heat treatment, pickling or so and/or rolling step in the succeeding process.

Thus, in conventional process, a grinding device is additionally arranged in the downstream of the welding unit. The welded joint is stopped at the grinding position of the grinding device to perform grinding for the welded section to be flush. This conventional process has needed to take about 100 seconds for performing grinding; i.e., for feeding the welded joint into the grinding apparatus, arranging the welded part with the center of the grinding wheel and finishing the grinding. This has remarkably lowered the efficiency of the continuous process line. Further, the grinding device should be additionally constructed, so that the construction cost for the process line will become high.

On the other hand, in order to perform upset butt welding and grinding for the excess metal of the welded joint at the same position, a specific device for grinding the excess metal by using a flush trimmer at the welding position has been proposed. (Refer to Japanese Patent Application Open Publication Nos. Sho. 51-121452 and 52-61143.) In this device, a shearing machine for cutting the ends of preceding plate and succeeding plate and a flush trimmer are arranged at one side of the welding apparatus. These shearing machine and the flush trimmer are inserted into the inner space of the welding apparatus when use. Clamping for grinding operation is carried out by means of a specially designed clamping device therefor or electrodes arranged at the inlet and outlet portion of the welding apparatus. Either requires an auxiliary clamping device, which has complicated structure to demand difficult operation procedure. Further, it is impossible to start the grinding operation until the welding operation along the whole width of the steel plate has been completed.

Although in conventional manner the welded section has been corrected by cutting with a cutting tool, such cutting operation can not completely remove the excess metal from the welded joint, especially when the two plates are different in their thickness. Additionally, conventional manner can not correct the undercut, so that this will cause various problems when the welded joint is subjected to rolling in the succeeding step.

SUMMARY OF THE INVENTION

It is an object of the present invention to provide an improved welding apparatus combined together with a grinding device in one system which can reduce required time for welding and grinding to promote highly efficient operation of the process line.

Another object of the present invention is to provide an improved welding apparatus with a grinding device which can correct undercut in addition to grinding excess metal at the welded joint.

Further object of the present invention is to provide an improved welding apparatus with a grinding device which can instantly grind the welded joint as the welding work proceeds so as to overcome troubles owing to welding faults and reduce working time.

Further object of the present invention is to provide an improved welding apparatus to save construction and equipment cost.

To accomplish the above objects, a welding apparatus for butt welding of steel plates such as steel strips according to the present invention provides technical means in one system as follows.

(1) A grinding device is assembled together in the welding apparatus for grinding the welded joint just after welding.

(2) The grinding device is so arranged that grinding wheels of the grinding device can be moved along the welded joint following the welding direction of the welding apparatus.

(3) Each upper clamping die for clamping the ends of the steel plates is provided with a mechanism for shifting the clamping die between a first clamping position during welding and a second clamping position during grinding.

(4) The upper clamping die and a welding backing strip are respectively divided into plural sections in the width direction of the steel plate, and each divided section is provided with the shifting mechanism. This shifting mechanism can shift the divided upper clamping die from a first clamping position for welding as soon as the welding thereof has finished, to a second clamping position for grinding in response to displacement of a welding torch. Also this shifting mechanism can shift the corresponding divided backing strip from backing position for welding to waiting position thereof.

(5) It is preferable to arrange that the upper part of the grinding device can be moved along a rail assembly for transferring the welding torch.

(6) It is also preferable to arrange that the lower part of the grinding device can be moved along another rail assembly for transferring a shearing machine assembled within the welding apparatus.

In the present invention a welding apparatus for butt welding steel plates such as steel strips is assembled together with a grinding device for correcting the excess metal or undercut at the welded joint, and thus this combined apparatus can provide various advantages such that the cost and space for constructing the welding system can be reduced and the flush welded joint correction can be quickly performed, and rupture troubles caused by processing and/or rolling in the subsequent steps can be completely eliminated. Further, production rates of a process line can be remarkably improved since the waste time for the grinding step is eliminated.

BRIEF DESCRIPTION OF THE DRAWING

FIG. 8 is an elevational view showing another embodiment having sectional clamping dies and backing strips.

DETAILED DESCRIPTION OF THE PREFERRED EMBODIMENT

Figure 4:
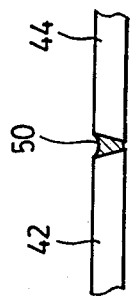
FIG. 4 is a sectional view showing the welded joint of steel plates with excess metal.
Figure 5:
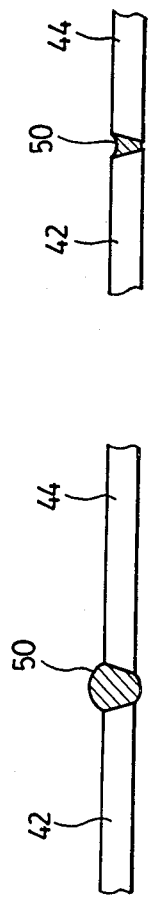
FIG. 5 is a sectional view showing the welded joint of steel plates with undercut.

FIG. 4 and FIG. 5 illustrate the sectional butt welded joint 50 of steel plates 42 and 44 with excess metal and with undercut, respectively. These irregular shaped sectional joint 50 may often effect excess stress concentration to result in rupture thereof, when the welded part is subjected to the succeeding process line or rolling step.

Figure 6:
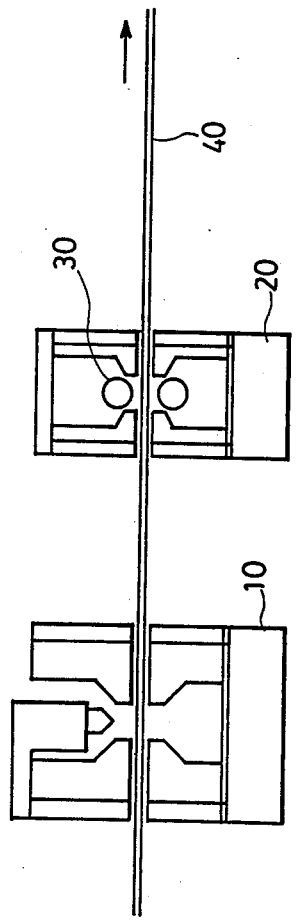
FIG. 6 is a schematic side view showing a conventional layout of welding device and grinding device.

To avoid such failure according to irregular shaped welded joint, as shown in FIG. 6, there is provided a grinding device 20 with grinding wheel 30 at the downstream of the welding apparatus 10 in the pass line of the steel plate 40.

Such system interrupts the speedy processing as described before.

Figure 1:
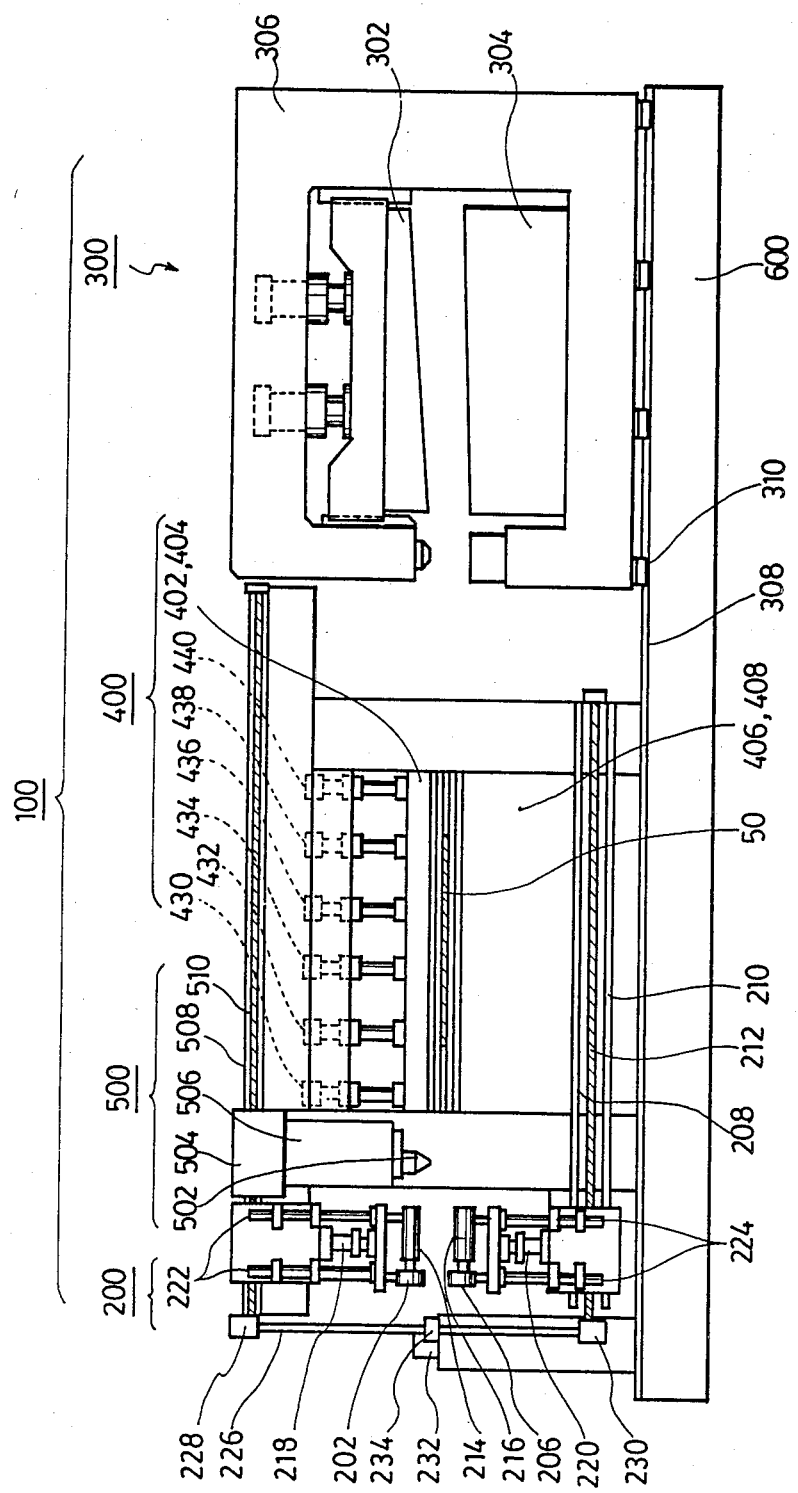
FIG. 1 is an elevational view showing an embodiment of a welding apparatus combined with a grinding device according to the present invention.
Figure 2:
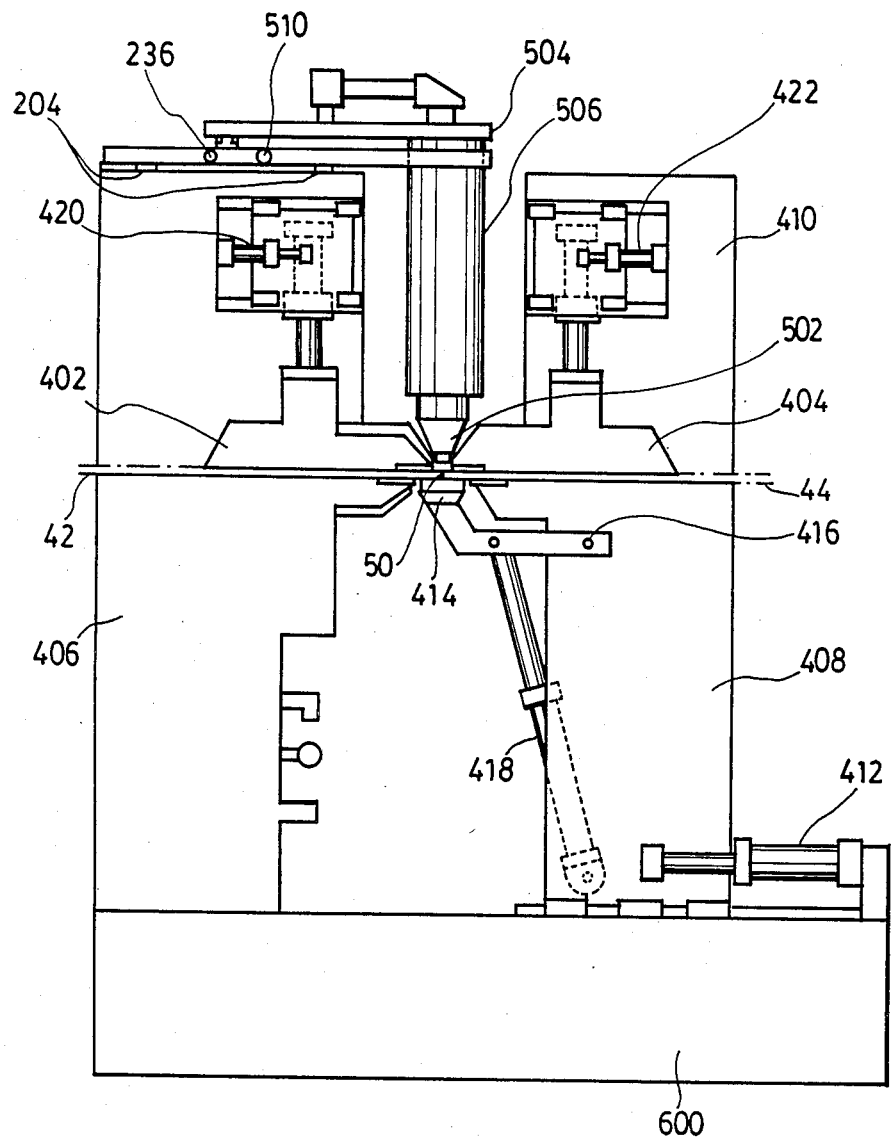
FIG. 2 is a side view of the apparatus shown in FIG. 1 in its welding operation.
Figure 3:
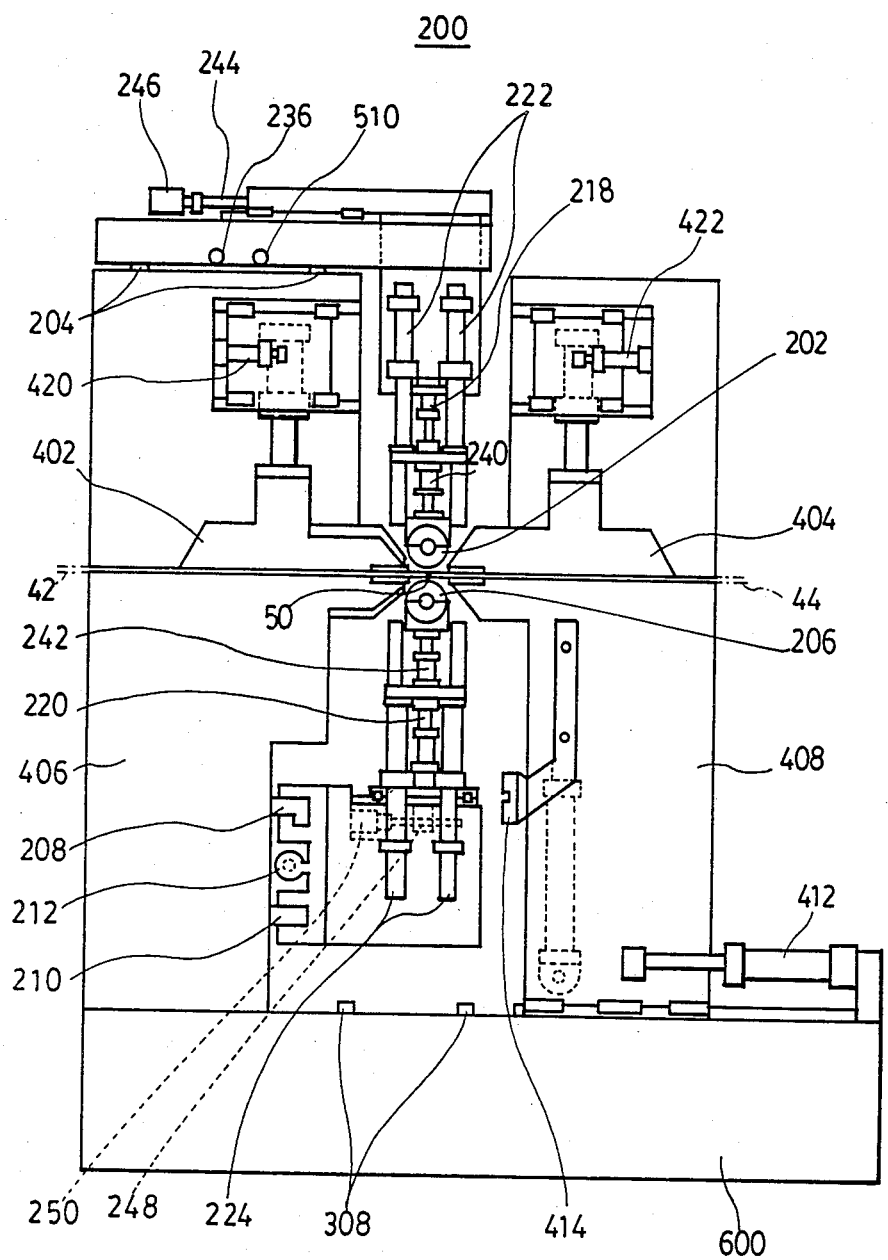
FIG. 3 is a side view of the apparatus shown in FIG. 1 in its grinding operation.

Referring to FIG. 1 to FIG. 3, there is shown an embodiment of a welding apparatus according to the present invention. In FIG. 1, the reference numeral 100 denotes a welding apparatus having a basic structure mainly comprising a shearing device 300 for edge preparation at ends of steel plates such as steel strips to be jointed by welding, a clamping mechanism 400 for clamping the plates, a welding system 500 and an especially additional grinding device 200 for instantly correcting the welded joint as being flush. They are assembled together on a common base 600.

Detailed description of the present invention referring to drawings will be set forth herein.

A welding torch 502 is hung from a welding torch support frame 504 through a torch support member 506. This support frame 504 can be moved along a rail assembly 508 by means of a ball screw 510. The welding torch 502 forms the welded joint in accordance with the movement thereof.

The both sides of the jointing portion of the preceding plate 44 and the succeeding plate 42 are clamped between upper clamping dies 402, 404 and lower clamping dies 406, 408 respectively during welding as shown in FIG. 2.

The grinding device 200 is shown in FIG. 3 in detail. A grinding wheel 202 for grinding the upper surface of the welded joint 50 can be moved along the rail assembly 204 for the welding torch system 500 by means of an upper ball screw 510. Another grinding wheel 206 for grinding the lower surface of the welded joint 50 can be also moved along a pair of guide rails 208 and 210 by means of a lower ball screw 212.

As shown in FIG. 1, drive units of the grinding device 200 comprise hydraulic motors 214 and 216 for revolving the grinding wheels 202 and 206, hydraulic cylinders 218 and 220 for lifting the grinding heads, guide members 222 and 224 for guiding the grinding wheels 202 and 206 up and down, a motor 232 for transferring the grinding units with grinding wheels 202 and 206, a countershaft 226 for driving the upper and lower ball screws 236 and 212 at the same time, gears 228 and 230 for transmitting the driving force, and a speed control unit 234 for controlling the motor 232.

Usually, a welding step of the apparatus begins with preparation of welding joint by shearing. The succeeding and preceding steel plates 42 and 44 to be welded are held at their each end position by pairs of upper and lower clamping dies 402 and 406 as well as 404 and 408, and respective forward and rear ends of the steel plates 42 and 44 are cut by means of the upper and lower shear edges 302 and 304 in a shearing machine frame 306. After shearing, the shearing machine frame 306 is transferred along the rail assembly 308 to its waiting position (off-line) as shown in FIG. 1. The reference numeral 310 denotes rollers secured to the shearing machine frame 306 for transferring it.

Then as shown in FIG. 2, a movable die assembly composed of an upper block 410, an upper clamping die 404 attached thereto and a lower clamping die 408 is shifted by means of a hydraulic cylinder 412 towards a stationary die assembly composed of an upper clamping die 402 and a lower clamping die 406. The movable die assembly is stopped with the sheared end of the preceding steel plate 44 at the nearest position to the sheared end of the succeeding steel plate 42. Subsequently, the welding torch 502 is transversely shifted toward the sheared ends of the plates 42 and 44, and descended to the welding joint 50 to be welded. Then, a backing strip 414 is lifted upward around a pivot pin 416 by means of a hydraulic cylinder 418 so as to press the both prepared ends of the succeeding and preceding plates 42 and 44 to the same level in accordance with the upper surfaces of the lower clamping dies 406 and 408. Then the welding is started, so that the welding torch 502 is moved along the butted ends of the plates to form the welding joint 50.

According to the present invention, in response to the shifting motion of the welding torch 502 after or during welding, the clamping position of the clamping dies 402 and 404 may be shifted in a distance from the welded joint 50, so as to let the upper grinding wheel move in a space between the clamping dies 402 and 404 along the welded joint 50 following as a tracer to the welding torch 502.

The description will be set forth in case that an operation for grinding is performed after the whole welded joint is completed.

The backing strip 414 is removed downwards to its waiting position by the hydraulic cylinder 418 as shown in FIG. 3. Clamping force applied to the upper clamping die 402 is released and the upper clamping die 402 is moved backward from the welding clamping position to a grinding clamping position by the cylinder 420. The upper clamping die 402 is set at the grinding position where the extreme edge thereof coincides with that of the lower clamping die 406 and then pressed downwards to the lower clamping die 406. Then clamping force applied to the upper clamping die 404 is released and the upper clamping die 404 is moved backwards from the welding clamping position to a grinding clamping position by the cylinder 422. The die 404 is set at the grinding position where the extreme edge thereof coincides with that of the lower clamping die 408 and then pressed downwards to the lower clamping die 408.

In order to shift the clamping position of the clamping dies, a lifting control device (not shown in the drawings) may be included in the lower clamping die 408. An operation of this lifting control device will be explained hereinafter.

Clamping force applied to the upper clamping die 404 at the movable die assembly is released and then the upper clamping die 404 is moved backward by the cylinder 422. The upper clamping die 404 is set at the corresponding position of the lower clamping die 408 and pressed downwards thereto. Then clamping force applied to the upper clamping die 402 at the stationary die assembly is released and the upper clamping die 402 is moved backwards by the cylinder 420. The clamping die 402 is set at the corresponding position of the lower clamping die 406. The clamping dies 404 and 408 are slightly lifted upwards together with the clamped steel plate by means of the lifting control device and shifted and set at an optimum position for grinding by means of the cylinder 412. Then the clamping dies 404 and 408 are moved downwards to the initial level. Next, the upper clamping die 402 is moved downwards and pressed onto the steel plate 42. In such manner as above described, the welded joint 50 can be certainly set at the optimum position for grinding by the lifting control device installed in the lower clamping die 408 at the movable die assembly. Especially, this mechanism will become effective for repeating grinding several times.

After clamping, the upper grinding unit is shifted along the rail assembly 204 to the welded joint 50 of the steel plates by the motor 232. The lower grinding unit is also shifted along the guide rails 208 and 210 in the same manner as above mentioned. The revolving force of the motor 232 is transmitted to the countershaft 226 through the speed control unit 234, and further to the ball screws 236 and 212 through the gears 228 and 230. Thus the upper and lower grinding units can travel at the same speed. When the grinding units are positioned near the welded joint 50, positions of the upper and lower grinding wheels 202 and 206 are adjusted by means of the hydraulic cylinders 218 and 220, respectively. Further they are finely adjusted to their optimum positions for grinding the welded joint by means of fine adjusting cylinders 240 and 242.

If the welded joint is not coincident with the center of the grinding device, or if the grinding aim is intended to leave the welded joint, the upper grinding wheel 202 is shifted by the ball screw 244 driven by the motor 246 and the lower grinding wheel 206 is also shifted by the ball screw 248 driven by the motor 250. The grinding wheels 202 and 206 are previously revolved by the motors 214 and 216 before the grinding device contacts to the welded joint 50. Finally, the grinding device 200 is shifted along the welded joint 50 by the motor 232 to perform grinding work.

Figure 7:
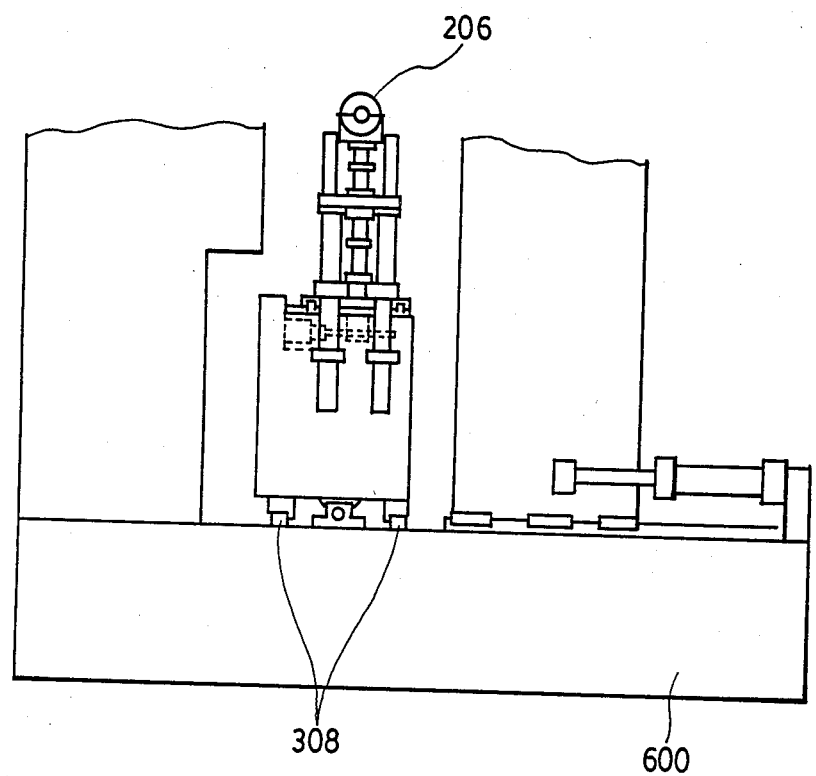
FIG. 7 is a side view showing a partially modified embodiment of FIG. 3.

In this embodiment, it is preferable to use the rail assembly 204 to guide for the welding torch 502 as the guide rail for the upper grinding unit as shown in FIG. 3. Also if the lower grinding unit is guided along the rail assembly 308 for the shearing machine frame as shown in FIG. 7, the whole structure of this welding apparatus can be simplified.

Additionally, in order to decrease time for welding and grinding, the grinding device 200 may be shifted as like as a tracer following to the movement of the welding torch 502. This will be achieved as follows.

The upper clamping dies 402 and 404 and the backing strip 414 are, as illustrated in FIG. 8, divided into many sections corresponding to each cylinder 430, 432, 434, 436, 438, 440 and the divided clamping die for each cylinder block is individually actuated. As the welding torch 502 passes each clamping position, the clamping position for welding of each corresponding divided upper clamping die is shifted to the clamping position for grinding as well as the corresponding each divided backing strip is released to the waiting position so that the grinding wheels may be inserted into each working position. According to this system, the grinding work can be advanced without waiting until the welding torch has moved along and performed welding over the whole length of the welding joint 50.

Furthermore, provided the position of the grinding wheel is controlled, the grinding work can be sufficiently performed even when thickness of the preceding steel plate is not equivalent to that of the succeeding plate, or the undercut is generated in the welded joint.

According to the present invention, installation space, construction cost and equipment cost of the welding apparatus and grinding apparatus can be minimized as well as the productivity of the process line can be raised owing to the short processing time in welding and grinding.

Furthermore, an automatic grinding position controller provides advantages to correct both excess metal and undercut generated in the welded joint, even if the jointing plates are different in thickness.

As many apparently widely different embodiments of this invention may be made without departing from the spirit and scope thereof, it is to be understood that the invention is not limited to the specific embodiments thereof except as defined in the appended claims.

What is claimed is:

1. A welding apparatus provided with a shearing means for shearing ends of preceding and succeeding steel plates, a welding means with welding torch for performing butt welding of the sheared ends, a clamping means for clamping the steel plates and a backing strip for backing up the welding joint during welding, comprising;
    (a) a grinding means for grinding the welded joint of the steel plate, said grinding means assembled together with the welding apparatus and located at a position behind the welding torch in the moving direction thereof for performing butt welding, grinding wheels of said grinding means being movable along the welded joint of the steel plates; and
    (b) a shift mechanism for shifting upper clamping dies of said clamping means between two clamping positions respectively for welding and grinding.

2. A welding apparatus provided with a shearing means for shearing ends of preceding and succeeding steel plates to be welded, a welding means with welding torch for performing butt welding of the sheared ends, a clamping means for clamping the steel plates and a backing strip for backing up the welding joint during welding, comprising;
- (a) a grinding means for grinding the welded joint of the steel plates, said grinding means assembled together with the welding apparatus and located at a position behind the welding torch in the moving direction thereof for performing butt welding, grinding wheels of said grinding means being movable along the welded joint of the steel plates;
- (b) a shift mechanism for shifting upper clamping dies of said clamping means between two clamping positions respectively for welding and grinding.
- (c) said upper clamping dies being respectively divided into plural sections along the welding joint of the steel plate, and each divided section thereof being provided with said shift mechanism; and
- (d) said backing strip being divided into plural sections along the welding joint of the steel plates, and each divided section thereof being provided with a shift mechanism for shifting the divided backing strip between two positions respectively for welding and waiting.

3. The welding apparatus of claim 1, wherein said grinding means comprises an upper grinding unit and a lower grinding unit, said upper grinding unit being capable of moving along a rail assembly for guiding the welding torch of said welding means.

4. The welding apparatus of claim 1, wherein said grinding means comprises an upper grinding unit and a lower grinding unit, said lower grinding unit capable of moving along a rail assembly for guiding said shearing means.

5. The welding apparatus of claim 1, wherein said grinding means comprises an upper grinding unit and a lower grinding unit, said upper grinding unit being capable of moving along a rail assembly for guiding the welding torch of said welding means, and said lower grinding unit capable of moving along a rail assembly for guiding said shearing means.

* * * * *